(12) United States Patent
Raney

(10) Patent No.: US 6,840,476 B1
(45) Date of Patent: Jan. 11, 2005

(54) RESONANT WINGBEAT TUNING CIRCUIT USING STRAIN-RATE FEEDBACK FOR ORNITHOPTIC MICRO AERIAL VEHICLES

(75) Inventor: David L. Raney, Yorktown, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/693,848

(22) Filed: Oct. 14, 2003

Related U.S. Application Data
(60) Provisional application No. 60/422,181, filed on Oct. 15, 2002.

(51) Int. Cl.$^7$ ................................................ B64C 33/02
(52) U.S. Cl. ............................ 244/11; 244/22; 244/72; 416/79
(58) Field of Search ............................. 244/11, 22, 72; 416/79–83; 440/13

(56) References Cited

U.S. PATENT DOCUMENTS

| 6,082,671 A | * | 7/2000 | Michelson | ................... | 244/72 |
| 6,446,909 B1 | * | 9/2002 | Michelson | ................... | 244/72 |

OTHER PUBLICATIONS

Yan et al, "Towards Flapping Wing control for a micromechanical flying insect" Dept of EECS, University of Cal Berkeley. 2001.*

Yan, "Wing force Map characterization and simulation for the Micromechanical flying Insect", Unversity of cal Berkeley 2003.*

Schenato et al "Controllability issues in flapping flight for biomimetic micro aerial vechicles (MAVs)" 2003.*

Deng et al "Attitude control for a micromechanical flying insect including thorax and sensor models." 2003.*

Fearing, "toward micromechanical flyers" The Bridge vol. 31, No. 4 Winter 2001.*

Frye "Effects of Stretch Receptor Ablation on the Optomotor Control of Lift in the Hawkmoth Manduca Sexta", journal of experimental biology 204, 3683–3691 (2001).*

Chai et al "flight thermogenesis and energy conservation in hovering hummingbirds" the journal of experimental biology 201, 963–968 (1998).*

Raney et al "mechanization and control concepts for biologyically inspired micro aerial vehicles" AIAA 2003–5345 Aug. 2003.*

* cited by examiner

*Primary Examiner*—Galen Barefoot
(74) *Attorney, Agent, or Firm*—Barry V. Gibbens

(57) ABSTRACT

A resonant wingbeat tuning circuit automatically tunes the frequency of an actuating input to the resonant frequency of a flexible wing structure. Through the use of feedback control, the circuit produces the maximum flapping amplitude of a mechanical ornithoptic system, tracking the resonant frequency of the vibratory flapping apparatus as it varies in response to change in flight condition, ambient pressure, or incurred wing damage.

26 Claims, 4 Drawing Sheets

US 6,840,476 B1

RESONANT WINGBEAT TUNING CIRCUIT USING STRAIN-RATE FEEDBACK FOR ORNITHOPTIC MICRO AERIAL VEHICLES

CROSS-REFERENCE TO RELATED APPLICATION

This application claims the benefit of U.S. Provisional Application No. 60/422,181, filed Oct. 15, 2002.

ORIGIN OF THE INVENTION

The invention described herein was made by an employee of the United States Government and may be manufactured and used by or for the Government for any governmental purpose without payment of any royalties thereon or therefor.

BACKGROUND OF THE INVENTION

1. Field of the Invention

The present invention relates generally to micro aerial vehicles. It relates more particularly to maximizing the flapping amplitude of ornithoptic micro aerial vehicles.

2. Description of the Related Art

The fundamental technology objective that motivates the present invention is the creation of a highly agile micro aerial vehicle (MAV), capable of rapidly performing reconnaissance missions in highly congested environments, such as the interior of a building, beneath a forest canopy, or within a network of tunnels and caves. Several biologically inspired concepts for the design of such a vehicle have been proposed that would employ an ornithoptic (flapping wing) system to enable the types of agile maneuvers and flight modes exhibited by insects and humming birds. Numerous technical challenges currently prevent the creation of such a device, including miniaturization of lightweight actuation mechanisms, structures, electronics and power sources. These are the basic building blocks that would be required to create an agile ornithoptic MAV. But even beyond the technical challenge of creating those building blocks lies the challenge of integrating them into an efficient, controllable flight system.

Current research efforts in flapping flight systems generally acknowledge the significance of operating at resonance, but the current practice is simply to estimate the resonant frequency of the flapping system based on observation, and then to drive the system with an open-loop periodic excitation at this frequency. Current and past research efforts using such an approach have attempted to provide ornithoptic MAV designs employing flexible wing structures, but to date no efforts have been made to develop an effective closed-loop self-tuning circuit to enable the flapping system to be driven at its resonant frequency.

The basic disadvantage of the prior art is that it assumes that the resonant frequency has been appropriately identified through a-priori testing and that it is invariant with flight mode, ambient conditions, and mechanical wear or damage to the system. Furthermore, if the significant effect of manufacturing variation in a one-off fabrication type of environment is to be accounted for, the resonant frequency of each article must be individually identified via a-priori testing.

BRIEF SUMMARY OF THE INVENTION

By contrast, the present invention provides a closed-loop excitation system that is continuously tuned to the resonant frequency of the flexible wing structure. The invention represents a fundamental basis for the control of a resonating wing structure that would compose the flight apparatus of an agile ornithoptic MAV. The concept has been developed and demonstrated using a benchtop laboratory apparatus.

The key feature of the problem addressed by this invention is the operation of the flapping wing mechanism at the resonant frequency of the fundamental structural mode of the flexible wing-and-actuator system. This is the frequency at which the actuation energy that is provided to the system is most efficiently converted to mechanical displacement of the wing structure; i.e.: the amplitude of vibration of the flexible wing structure will be maximized when periodic excitation of the structure is provided at the resonant frequency.

In order to accomplish this objective, a piezoelectric strain rate sensor is attached to the flexible wing structure. An actuator system is provided to excite vibration of the wings. Excitation of the wings causes a periodic vibratory signal to be emitted from the sensor. The sensor's periodic signal is fed through a software algorithm, which converts the signal to a square wave of the same frequency. The resulting square wave is amplified and fed back through the actuator to drive the flexible wing structure at the frequency and amplitude provided by the square wave input. After a very few cycles, the closed-loop, iterative process causes the system to tune itself to resonance, thereby driving the flexible wing structure at its resonant frequency, at which the system operates most efficiently.

DETAILED DESCRIPTION OF THE INVENTION

Purpose

The purpose of the present invention is to automatically tune the inputs that drive an aeroelastic flapping flight system to the resonant frequency of the flexible wing structure, thereby maximizing the amplitude of the resulting vibration, which constitutes the flapping motion produced by the mechanism. The technological innovation is a novel application of existing components, namely, the application of a thin film polyvinylidene fluoride (pvdf) strain rate sensor to a flexible wing structure with the express purpose of using the resulting strain rate signal to drive the wing structure at its fundamental vibratory frequency. Although the innovation was developed with the use of a flexible wing structure consisting of a latex membrane bonded to a graphite-epoxy prepreg composite frame, the innovation is not limited to this particular wing composition.

Components

Figure 1:
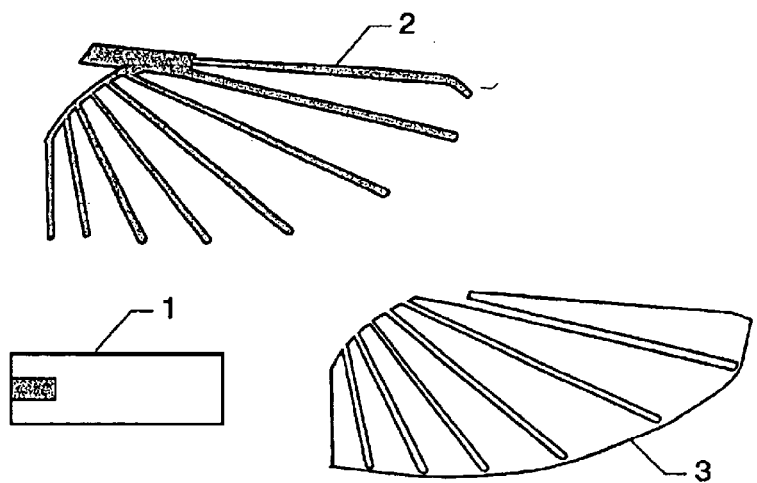
FIG. 1 is an illustration of strain-rate-sensing flexible wing components.
Figure 2:
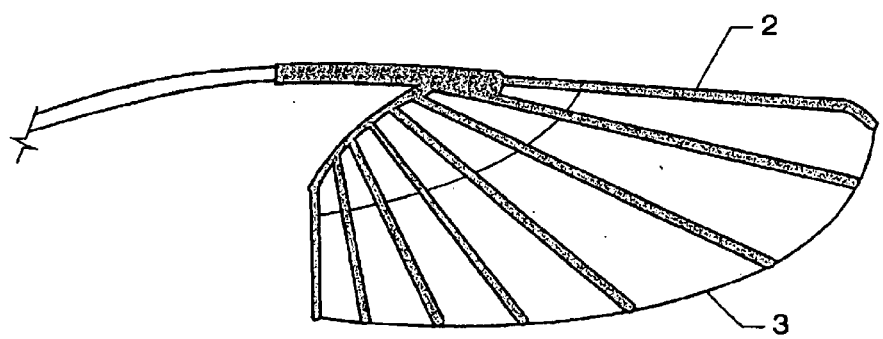
FIG. 2 is an illustration of a completed strain-rate-sensing wing assembly.
Figure 3:
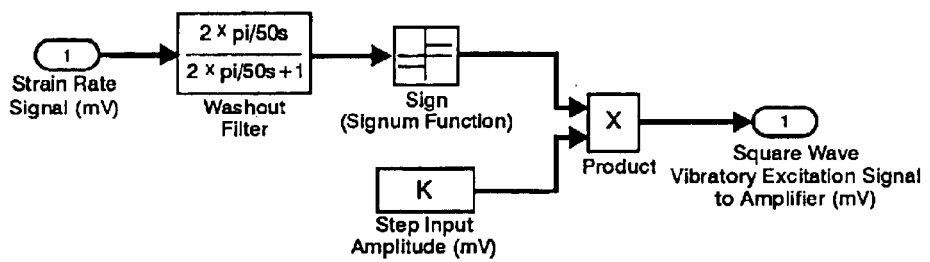
FIG. 3 is a depiction of one embodiment of a resonant tuning circuit algorithm.

Components of the innovation are shown in FIGS. 1 through 3. Specifically, a thin film pvdf strain rate sensor 1, in this case a metallized pvdf film measuring 28 µm×15 mm×40 mm manufactured by Measurement Systems, Inc. (MSI), along with an example of a flexible wing structure having a geometry inspired by a humming bird wing, is shown in FIG. 1. The wing structure, fabricated at NASA Langley, consists of a graphite-epoxy frame 2 and a 4-mil latex membrane 3. The latex membrane 3 is bonded to the composite frame using a spray adhesive. Leads are attached to the sensor 1 using tape or spray adhesive, and the sensor is then bonded to the flexible wing structure using spray adhesive. The position and orientation of the sensor on the structure should be selected to provide adequate sensitivity to the lowest frequency bending and torsion modes of the wing. An example of a completed assembly is shown in FIG. 2.

A capacitor should be placed in parallel with the sensor to provide some effective attenuation of signal noise from the strain rate sensor. In one embodiment of the present invention, a 0.047 µF ceramic disk capacitor is used. Also in one embodiment, a high-pass filter (washout) is provided in the software that operates on the output of the strain rate sensor to eliminate any steady-state bias or drift in the sensor signal. In the current embodiment of the present invention, the washout filter has the transfer function shown in equation (1) with Tau=0.125.

Equation 1, Transfer function of washout filter applied to strain-rate sensor signal:

$$\frac{Num(s)}{Den(s)} = \frac{\tau s}{\tau s + 1}$$

Another component of the present invention is a feedback algorithm that converts the strain rate sensor output into a signal that drives the vibratory excitation actuator. In its simplest form, the sign of the strain rate sensor output signal (appropriately conditioned with the, capacitor and washout filter components that were previously described) may be multiplied by a constant to produce a square wave of appropriate magnitude for input to an amplifier that drives the excitation actuator. A diagram describing this simple feedback algorithm is shown in FIG. 3. Such a system has been implemented and has performed quite reliably in a prototype laboratory setup through which practical application has been achieved.

Figure 4:
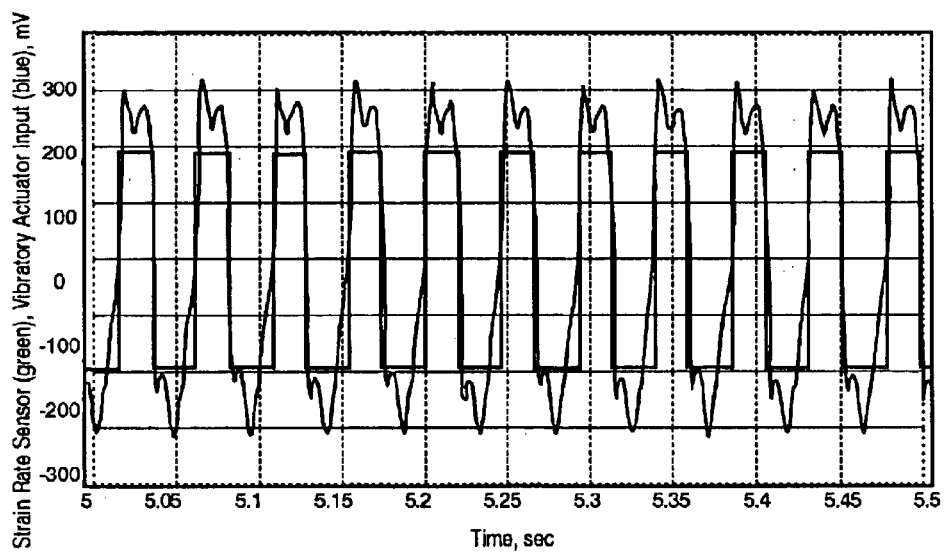
FIG. 4 is an illustration of data resulting from strain rate sensor output and vibratory actuator input from one embodiment of the present invention.

Example time histories from the strain rate sensor and the resulting square wave vibratory excitation signal are shown in FIG. 4, which illustrates the periodic vibratory strain rate sensor output, and the resultant square wave actuator input.

Figure 5:
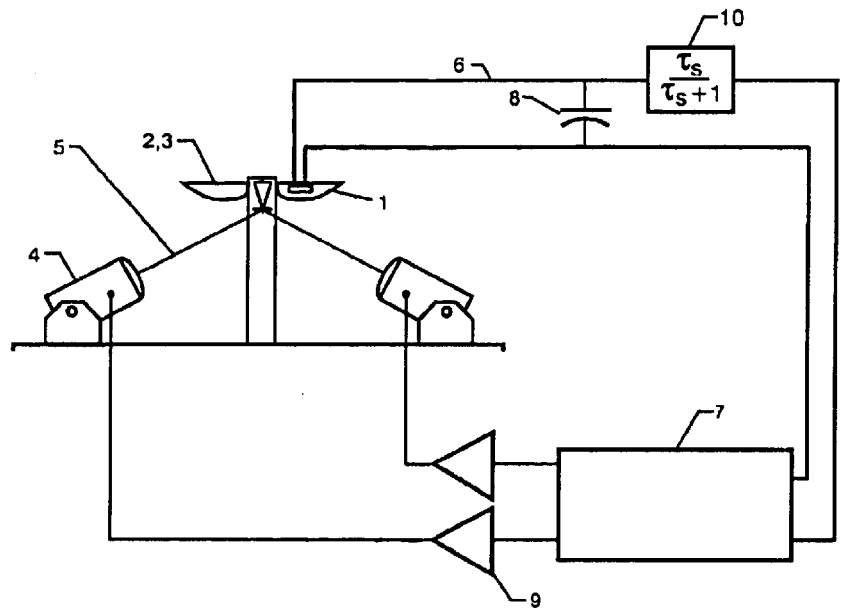
FIG. 5 is a flowchart depicting components and operation of one embodiment of the present invention.

A flowchart depicting the arrangement of the aforementioned components is shown in FIG. 5. In FIG. 5, the strain rate sensor 1 is attached to the flexible wing structure 2,3. The flexible wing structure is excited by the actuator 4, which can be attached to the wing structure by any number of means, in this case a nylon tendon 5. The strain rate feedback signal 6 passes back through the filter 10 and the tuning algorithm 7, preferably in parallel with a capacitor 8. After conversion by the tuning algorithm to a square wave, the feedback signal passes through amplifiers 9 and then drives the actuator(s) 4 to once again excite the flexible wing structure 2,3, where the iterative, closed-loop process begins again.

Functional Operation

In operation, the piezoelectric properties of the strain-rate sensor cause it to generate a signal in response to vibration of the flexible wing structure. This signal is used to generate a periodic waveform that is amplified to drive an actuation apparatus that excites further vibration of the wing structure. In this way, a closed-loop system is produced that undergoes a limit cycle oscillation at the resonant frequency of the flexible wing structure. The signal that drives the excitation actuators is automatically tuned to the resonant frequency of the structure by virtue of the positive feedback of strain rate, which is 90 degrees out of phase with the displacement of the structure.

Alternate Embodiments

A fundamental extension to the tuning circuit is possible for cases in which the flexible wing structure is driven with more than one vibratory excitation actuator. By varying the phase and relative amplitudes between the actuator feedback signals, it is possible to achieve control over the resonant wingbeat pattern produced by the apparatus. Such an arrangement was shown in FIG. 5. By virtue of the dual-actuator arrangement, this test is able to generate wingbeat patterns that approximate those of a humming bird in various flight modes. Wingtip trajectories produced by the test stand may be made apparent by the addition of LEDs to the tips of the flexible wing structures. Various wingbeat patterns approximating those of humming birds may be produced by altering the phase and amplitude of the strain-rate feedback signal to the individual actuators in the dual actuation system. Using this technique in lab tests with the system illustrated in FIG. 5, wingbeat patterns have been produced which closely model those of a hummingbird in high-speed cruise, low-speed cruise, hover, and reverse flight modes.

There are also many potential variations of the feedback algorithm that converts the strain rate sensor output into the signal that drives the vibratory excitation actuator. In its simplest form, the sign of the strain rate sensor output signal (appropriately conditioned with the capacitor and washout filter components that were previously described) may simply be multiplied by a constant to produce a signal of appropriate magnitude for input to an amplifier that drives the excitation actuator. But this algorithm generates an actuator input having the form of a square wave. It may be desirable to generate an input having a different form, such as a sine wave, a sawtooth, or a ramp. In such cases, generally simple modifications may be made to the feedback algorithm to generate these forms.

Peripheral Equipment

The peripheral equipment described in this section was used in the operation of the resonant ornithoptic test stand shown in FIG. 5, and therefore represents one embodiment of the present invention. Although these devices were used to develop and demonstrate the innovation in a laboratory setting, the innovation concept itself is independent of these particular devices, and may be implemented by other means or applied using a different apparatus.

Actuators: Two Labworks Model ET-126A electro-dynamic shaker actuators were used to provide the vibratory excitation inputs to the resonant ornithoptic test-bed apparatus.

Amplifiers: Two Labworks Model PA-138-1 power amplifiers were used to amplify the signals from the resonant tuning feedback algorithm to drive the electro-dynamic shaker actuators.

Real-time control processor & I/O boards: The resonant tuning control algorithm was implemented using a dSpace Model DS 1005 480 MHz Power PC 750 processor with a model DS2003 16-bit A-to-D converter board, and a Model DS210314-bit D-to-A converter board. The real time process was implemented to run at a frame rate of 1 KHz.

Additional Features

One feature of the present invention is that it uses feedback to continuously tune the periodic excitation of a flexible flapping wing structure to the resonant frequency of that structure, thereby maximizing the amplitude of the flapping motion that is produced by the energy supplied to the system. The practice of using strain rate feedback to intentionally destabilize an aeroelastic system (in this case resulting in a limit cycle oscillation at the resonant frequency of the system) is novel.

The advantages that result from the use of feedback in this instance are the same as those provided by the use of closed-loop control in general, namely the ability to maintain desired performance in the presence of variation in the operating environment or changes in system characteristics. But in this instance there is the additional benefit of eliminating the need for extensive a-priori characterization of the test article prior to operation; i.e., the resonant flapping frequency need not be identified for each article prior to operation, but rather is a natural outcome that is reported as a result of closed-loop operation of the device.

Figure 6:
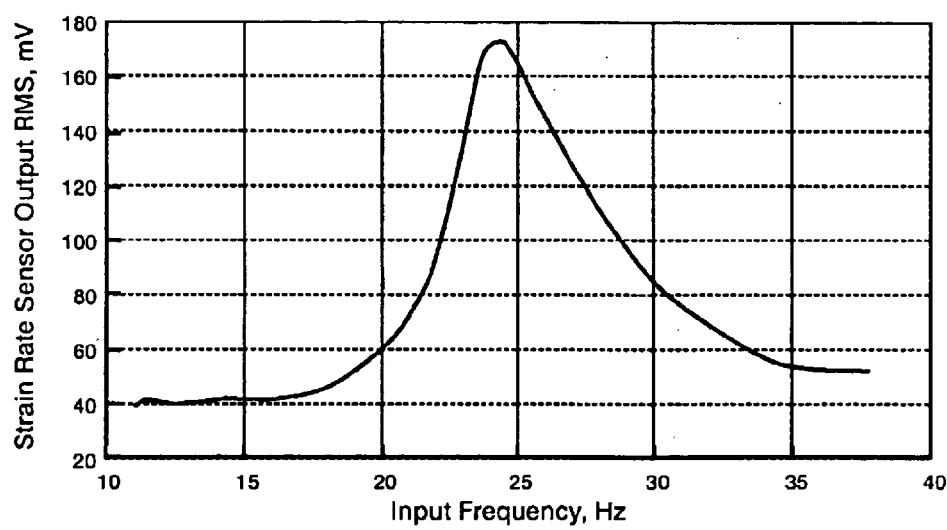
FIG. 6 is a frequency sweep showing the maximum sensor output at the fundamental resonant frequency of one flexible wing structure.

Test data are shown that illustrate two features key to the present invention. The first is an open-loop frequency sweep of a sinusoidal input to a flexible wing test-bed equipped with the strain rate sensor film laminated to the wing structure as previously described. The RMS (root-mean-square) output of the strain rate sensor is plotted against input frequency in FIG. 6. The sensor output reaches a maximum at the frequency at which the amplitude of the flexible wing vibration is greatest. This maximum defines the fundamental resonant frequency of the flexible wing structure, shown on the FIG. 6 embodiment at 24 Hz.

Figure 7:
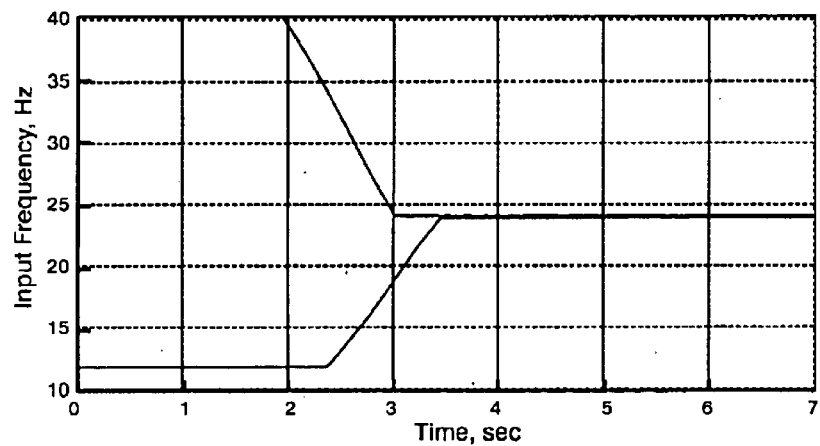
FIG. 7 is an illustration of time-histories of actuator excitation frequency showing convergence to resonant frequency at 24 Hz.

In FIG. 7, two time histories of frequency of actuator excitation are shown. In the first time history (lower line), the system is started at an open-loop frequency of 12 Hz. When the closed-loop resonant tuning system is turned on, the actuator input rapidly converges to that frequency which was identified as the resonant frequency as in FIG. 6. Likewise, in the second time history (upper line), the system is started at an open-loop frequency of 40 Hz, and converges to the resonant frequency within approximately 1 second of activating the closed-loop resonant tuning circuit.

Figure 8:
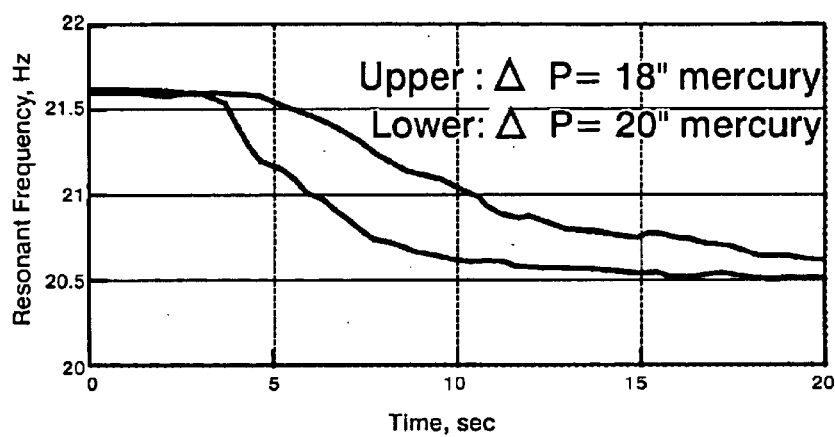
FIG. 8 is a depiction of changes in resonant frequency with decreasing ambient pressure.

Another feature of the present invention illustrated by test data is its ability to track changes in the resonant frequency of the mechanical system in response to variation in ambient pressure. The time histories shown in FIG. 8 show the change in excitation frequency of the closed-loop system as it was subjected to pressure changes of approximately 18Δ and 20Δ of mercury (over a period of 20 seconds), while operating within a vacuum-chamber bell jar apparatus. The closed-loop system tracks the changes in resonant frequency due to the variation in ambient pressure.

Although the feedback control algorithm in this research activity was developed using a Matlab control analysis software package, and implemented using dSpace real-time hardware-in-the-loop engineering tools, these tools are not part of, or required by, the present invention. The specific application of strain-rate sensor components to the ornithoptic system, and design for the associated resonant tuning feedback control algorithm, constitute the subject of the present invention and are independent of the software tools that would be used to implement them.

The descriptions of the present invention represent the invention in its current embodiment as practical application has been achieved in the lab environment. It should be understood that additional changes in the details, materials, process steps, and part arrangement may be made by those skilled in the art within the principle and scope of the invention as expressed in the appended claims.

Although the invention has been described relative to a specific embodiment, there are numerous variations and modifications that will be readily apparent to those skilled in the art in light of the above teachings. It is therefore to be understood that, within the scope of the appended claims, the invention may be practiced other than as specifically described.

What is claimed is:

1. A tuning circuit for enabling the excitation of a flexible structure at its resonant frequency, comprising a strain rate sensor configured for attachment to the flexible structure and capable of producing a feedback signal in response to the excitation of the flexible structure, a tuning algorithm capable of converting the feedback signal to a desired periodic waveform, and a first actuator capable of receiving the converted waveform and configured for exciting an oscillatory vibration of the flexible structure.

2. A tuning circuit according to claim 1, further comprising an amplifier capable of amplifying the desired periodic waveform.

3. A tuning circuit according to claim 2, further comprising a filter capable of removing steady state drift from the feedback signal.

4. A tuning circuit according to claim 3, further comprising a capacitor configured for and capable of removing high frequency noise from the feedback signal.

5. A tuning circuit according to claim 4, wherein the desired periodic waveform is a square wave.

6. A tuning circuit according to claim 5, further comprising a second actuator configured so as to provide vibratory input to the flexible structure along an axis different from the oscillatory vibration excited by the first actuator.

7. A tuning circuit according to claim 6, wherein the vibratory input provided by the second actuator to the flexible structure differs in phase and amplitude from the oscillatory vibration excited by the first actuator.

8. A tuning circuit according to claim 4, further comprising a second actuator configured so as to provide vibratory input to the flexible structure along an axis different from the oscillatory vibration excited by the first actuator.

9. A tuning circuit according to claim 8, wherein the vibratory input provided by the second actuator to the flexible structure differs in phase and amplitude from the oscillatory vibration excited by the first actuator.

10. A tuning circuit according to claim 9, wherein the desired periodic waveform is a square wave.

11. A tuning circuit according to claim 9, wherein the desired periodic waveform is a sine wave.

12. A tuning circuit according to claim 9, wherein the desired periodic waveform is a sawtooth.

13. A tuning circuit according to claim 9, wherein the desired periodic waveform is a ramp.

14. A method for maximizing the vibrational amplitude of a flexible structure, comprising the steps of exciting vibration of a flexible structure instrumented with a strain rate sensor capable of producing a feedback signal in response to the vibration of the flexible structure, converting the feedback signal to a desired periodic waveform, and re-exciting the flexible structure with a first actuator driven by the desired periodic waveform.

15. A method for maximizing the vibrational amplitude of a flexible structure according to claim 14, further comprising the step of amplifying the desired periodic waveform.

16. A method for maximizing the vibrational amplitude of a flexible structure according to claim 15, further comprising the step of filtering steady state drift from the feedback signal.

17. A method for maximizing the vibrational amplitude of a flexible structure according to claim 16, further comprising the step of removing high frequency noise from the feedback signal.

18. A method for maximizing the vibrational amplitude of a flexible structure according to claim 17, wherein the desired periodic waveform is a square wave.

19. A method for maximizing the vibrational amplitude of a flexible structure according to claim 18, further comprising the step of providing vibratory input from a second actuator to the flexible structure along an axis different from the oscillatory vibration excited by the first actuator, simultaneous to the step of re-exciting the flexible structure with an actuator driven by the desired periodic waveform.

20. A method for maximizing the vibrational amplitude of a flexible structure according to claim 19, wherein the vibratory input provided by the second actuator to the flexible structure differs in phase and amplitude from the oscillatory vibration excited by the first actuator.

21. A method for maximizing the vibrational amplitude of a flexible structure according to claim 17, further comprising the step of providing vibratory input from a second actuator to the flexible structure along an axis different from the oscillatory vibration excited by the first actuator, simultaneous to the step of re-exciting the flexible structure with an actuator driven by the desired periodic waveform.

22. A method for maximizing the vibrational amplitude of a flexible structure according to claim 21, wherein the vibratory input provided by the second actuator to the flexible structure differs in phase and amplitude from the oscillatory vibration excited by the first actuator.

23. A method for maximizing the vibrational amplitude of a flexible structure according to claim 22, wherein the desired periodic waveform is a square wave.

24. A method for maximizing the vibrational amplitude of a flexible structure according to claim 22, wherein the desired periodic waveform is a sine wave.

25. A method for maximizing the vibrational amplitude of a flexible structure according to claim 22, wherein the desired periodic waveform is a sawtooth.

26. A method for maximizing the vibrational amplitude of a flexible structure according to claim 22, wherein the desired periodic waveform is a ramp.

* * * * *